March 24, 1925.
G. W. LISK
1,530,781
SPRAYER PIPE
Filed Oct. 4, 1923
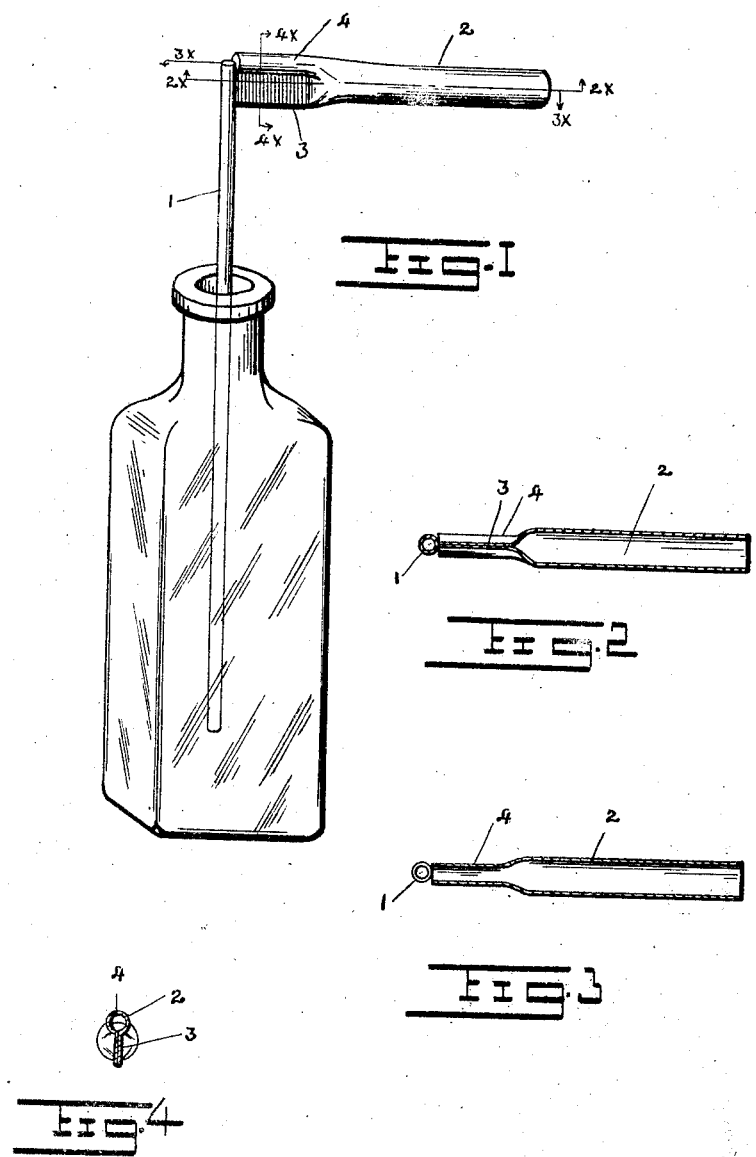
INVENTOR.
George W. Lisk
BY
ATTORNEY.

Patented Mar. 24, 1925.

1,530,781

UNITED STATES PATENT OFFICE.

GEORGE W. LISK, OF CLIFTON SPRINGS, NEW YORK.

SPRAYER PIPE.

Application filed October 4, 1923. Serial No. 666,601.

*To all whom it may concern:*

Be it known that I, GEORGE W. LISK, citizen of the United States, residing at Clifton Springs, in the county of Ontario and State of New York, have invented certain new and useful Improvements in Sprayer Pipes, of which the following is a specification.

The object of this invention is to provide a new and improved form of sprayer pipe used in spraying rose bushes, shrubs, etc. the invention having for its object more especially to cheapen the cost of construction of the sprayer pipe.

This and other objects of this invention will be fully illustrated in the drawing, described in the specification and pointed out in the claims at the end thereof.

In the accompanying drawing:

Figure 1 is a perspective view of a bottle with the sprayer pipe in working position with reference thereto.

Figure 2 is a horizontal section on the line 2ˣ—2ˣ of Figure 1.

Figure 3 is a horizontal section on the line 3ˣ—3ˣ of Figure 1.

Figure 4 is a vertical section on the line 4ˣ—4ˣ of Figure 1.

In the drawings like reference numerals indicate like parts.

In the drawings reference numeral 1 indicates the suction tube and reference numeral 2 indicates the blowing tube. The suction tube 1 is a plain cylindrical tube. The blowing tube 2 is made as a plain cylindrical tube at the start but at one end the shape of the tube is changed so as to provide a flat section 3 therein, this flat section being made by flattening the tube at that point and bringing a portion of its opposite sides together. The tube is left with a small cylindrical section 4 immediately above the flattened section. The edge of the flat section 3 provides a convenient surface or bracket by which the tube 2 can be firmly fastened to the tube 1.

Heretofore, these tubes have been joined together by a special bracket which was a third piece but by forming the blowing tube in the manner described, the flattened portion of the end of the tube can be used as a bracket, for the purpose of joining the two tubes together, it being understood that the joining is accomplished by soldering in the ordinary way.

It will also be understood that blowing tubes as heretofore made have been made with a taper to facilitate the blowing with the mouth at the large end and give a small size to the other end of the tube with a corresponding increase in the velocity of the blast at the small end. But in my improved form the blowing tube is preferably made cylindrical to start with and the taper is secured by flattening the tube at one end to form the bracket as above described. The opening at the end of the tube is reduced in size so as to give velocity to the jet and reduce the size thereof.

By making the tubes in this way the sprayer pipes can be made considerably cheaper than the sprayers heretofore made and are just as serviceable.

I claim:

1. A sprayer pipe having a blow tube one end of which is partially flattened to form a bracket and reduce the size of the orifice.

2. A sprayer pipe having a blow tube one end of which is partially flattened to form a bracket and reduce the size of the orifice, a suction tube fastened to the bracket so formed.

3. A sprayer pipe having a blow tube of uniform section through part of its length, the remainder of its length being partially flattened to form a bracket and reduce the size of the orifice, at the end of the blow tube.

4. A sprayer pipe having a blow tube of uniform section through part of its length, the remainder of its length being partially flattened to form a bracket and reduce the size of the orifice at the end of the blow tube, a suction tube fastened to the bracket so formed.

In testimony whereof I affix my signature.

GEORGE W. LISK.